United States Patent [19]
Cloutier et al.

[11] Patent Number: 5,433,656
[45] Date of Patent: Jul. 18, 1995

[54] LINKAGE CONTROLLED SPRING POWERED FEED SYSTEM

[75] Inventors: Daniel R. Cloutier, Clayton; Mark E. Maichel, St. Louis, both of Mo.; David M. Moehn, Alton, Ill.

[73] Assignee: Sunnen Products Company, St. Louis, Mo.

[21] Appl. No.: 48,115

[22] Filed: Apr. 14, 1993

[51] Int. Cl.⁶ .................. B24B 33/00; B24B 49/08
[52] U.S. Cl. ......................... 451/156; 74/106; 451/24
[58] Field of Search ............. 51/31, 34 R, 57, 59 R; 74/102, 104, 105, 110, 100.1, 106; 451/24, 27, 156, 157

[56] References Cited

U.S. PATENT DOCUMENTS

| | | | |
|---|---|---|---|
| 2,563,143 | 8/1951 | Wells et al. | 74/104 |
| 3,105,413 | 10/1963 | Lanzenberger | 74/110 X |
| 3,263,511 | 8/1966 | Wellstein | 74/102 X |
| 3,451,175 | 6/1969 | Sunnen et al. | 451/27 X |
| 4,837,982 | 6/1989 | Berkeley et al. | 451/24 |

*Primary Examiner*—Joseph M. Gorski
*Attorney, Agent, or Firm*—Haverstock, Garrett and Roberts

[57] ABSTRACT

A linkage controlled spring powered feed system for maintaining a virtually constant force against a linearly movable member such as the feed member of a honing machine or other device, the system including a lever member having one end which bears against the linearly movable member and an opposite end, the lever member being pivotally mounted at a location between the opposite ends thereof on the machine frame, a linkage assembly bearing against the opposite end of the lever member in a direction to apply force against the linearly movable feed member, the linkage assembly including a first expandable link member having a compression spring for exerting force against the lever member and a second link member for adjusting the position where the linkage assembly engages the lever member as the lever member moves about the pivotal support to change the effectiveness of the compression spring in applying force to the linearly movable member. The present system can optionally include an additional linkage enabling selectively adjusting the level of constant force to be applied against the linearly movable member, and one or more cam members and spring members enabling speed control, counteracting and otherwise affecting the force applied against the linearly movable member.

24 Claims, 9 Drawing Sheets

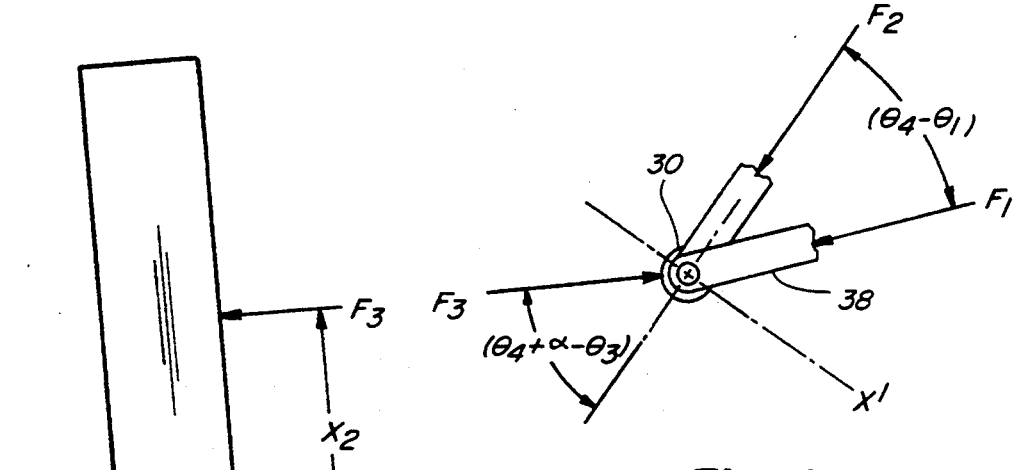
Fig. 4
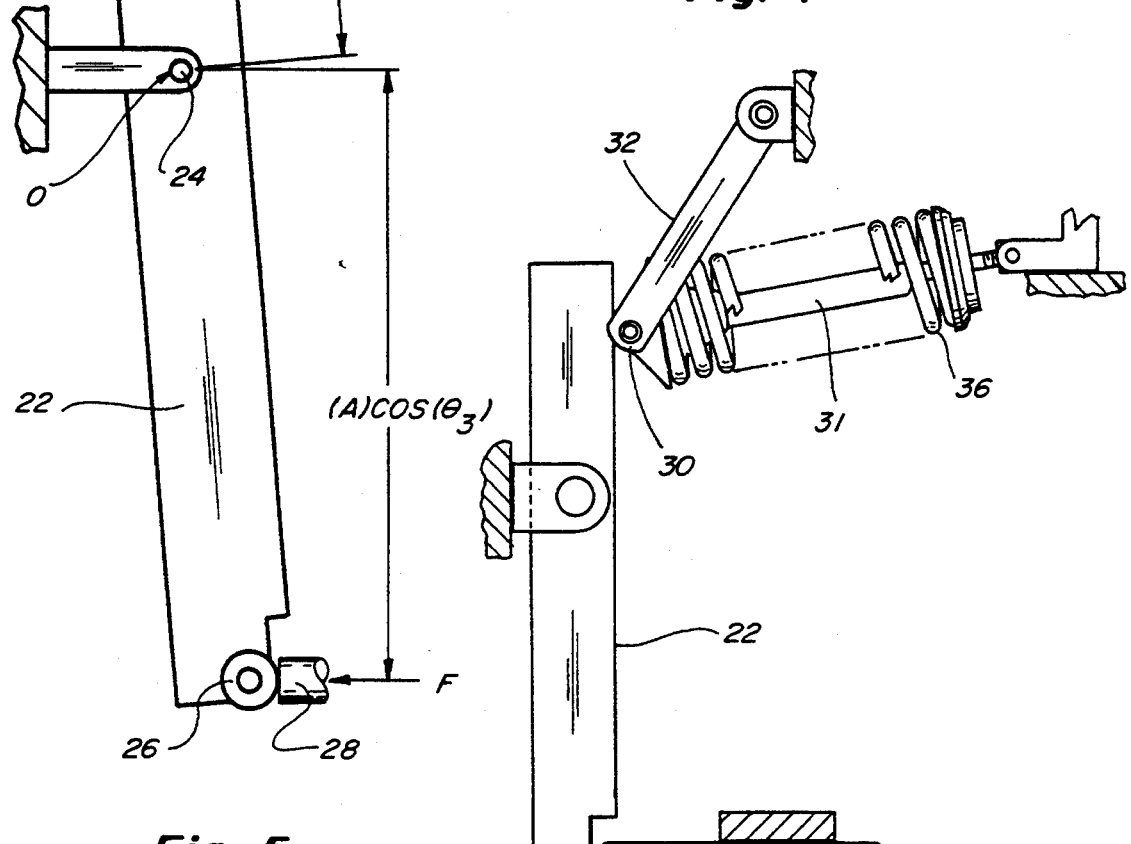
Fig. 5
Fig. 11

LINKAGE CONTROLLED SPRING POWERED FEED SYSTEM

The present invention relates to means for maintaining the force on a working member such as a honing stone in a honing mandrel virtually constant yet selectable forcewise over the range of movement of the work engaging parts. The device is primarily mechanical and includes a linkage controlled spring powered feed apparatus having a main lever member pivotally mounted to the frame of the machine in position to operate against a feed rod. Attached to the main lever near one end is a roller member which bears against one end of the feed rod, the opposite end of which may be a feed mechanism or wedge assembly in the case of a honing mandrel used to radially advance the honing member or members. In one embodiment of the device a compressed spring which is part of a link roller assembly bears against a location near the opposite end of the main lever. The spring is mounted on an axially extendable link assembly and includes a compressed spring which provides the force for pivoting the main lever and advancing the feed rod. The end of the spring link roller assembly opposite from the main lever is pivotally attached to the machine frame. The amount of force and where it is applied by the spring link roller assembly against the main lever are selectable and variable and is determined by such parameters as the amount of compression force in the spring, the relative angle between of the spring link roller assembly and the main lever, and also by the constant of the spring.

An advantage of the present device over previous devices used for applying force to a feed rod or other linearly movable member is that the present device is able to be constructed to apply a virtually constant force to the feed rod over a given range of travel. The amount of force may also be selectable and controllable so that a wide range of selectable applied forces can be made available relatively simply from the same device. Once the desired force has been selected it remains or can be made to remain virtually constant over the range of movement of the feed rod.

Also, the rollers and pivots can be constructed with ball or roller bearings, making the motion virtually frictionless. This is a significant improvement over other constant force devices such as pneumatic or hydraulic cylinders, especially in applications where the motion is relatively slow.

While the present device was developed for use with honing machines and specifically for the feed mechanisms or wedge members associated therewith, it is applicable to many other devices as well, particularly devices that require a constant force be applied over a range of feed movement. This can apply to many machines.

Many devices have been used in the past to produce the necessary force on a member such as on a feed rod in a machine tool, but for the most part the known devices have been devices that use spring means to produce the force and wherein as the force of the spring is reduced or used up by movement, the force will vary, reducing the applied force from a relatively high force at the beginning of an operation to a lower force as the operation reaches completion. Known devices however, do not provide means to compensate for force variations. Also constant feed force improves productivity by reducing cycle time and/or stonewear.

It is the ability to switch feed force from roughing to finishing that will improve uniform size and surface characteristics as will be explained. Typical of known devices for producing the feed force necessary to drive a honing stone in a honing mandrel against the work surface are the devices disclosed in the following listed patents: Sunnen U.S. Pat. No. 3,152,424 and Vanderwal U.S. Pat. No. 4,397,658.

OBJECTS OF THE PRESENT INVENTION

It is a principal object of the present invention to provide means for maintaining the driving force on a member virtually constant over the range of movement thereof.

Another object is to compensate for variations in the force applied by a compression spring as the spring expands and uses up its force.

Another object is to maintain the force applied by a spring to a linearly movable member constant over the range of movement thereof.

Another object is to provide relatively simple easily adjustable means for producing a constant driving force over a range of movement, which means are also adjustable to vary or select from among different driving forces as required.

Another object is to provide relatively simple and inexpensive means for producing the feeding force for a machine tool such as a honing mandrel.

Another object is to make it possible to maintain a constant driving force on a linearly movable feed rod.

Another object is to make it possible to relatively quickly and easily shift between different forces being applied to a linearly movable feed member in order to change the force applied thereto, the selected force being constant ever the range of movement of the feed member for all selectable forces.

Another object is to enable the production of more uniform parts produced by machine tools such as by honing machines and the like.

Another object is to add to the options available for producing feed motion to a feed rod or like device.

Another object is to reduce the cost of most honing applications by maintaining the optimum feed force throughout the honing cycle.

These and other objects and advantages of the present invention will become apparent after considering the following detailed description of several preferred embodiments of the invention in conjunction with the accompanying drawings.

BRIEF DESCRIPTION OF THE DRAWINGS

FIG. 4 is a fragmentary view of the spring link roller portion of the device shown in FIGS. 1-3;

FIG. 5 is a side view of the main lever used to apply force in the device shown in FIGS. 1-3;

FIG. 11 shows the simplest form of the device, where the input link is omitted and the control link is pivotally attached to the frame to provide a single constant output force.

DETAILED DESCRIPTION OF THE PREFERRED EMBODIMENTS

Figure 1:
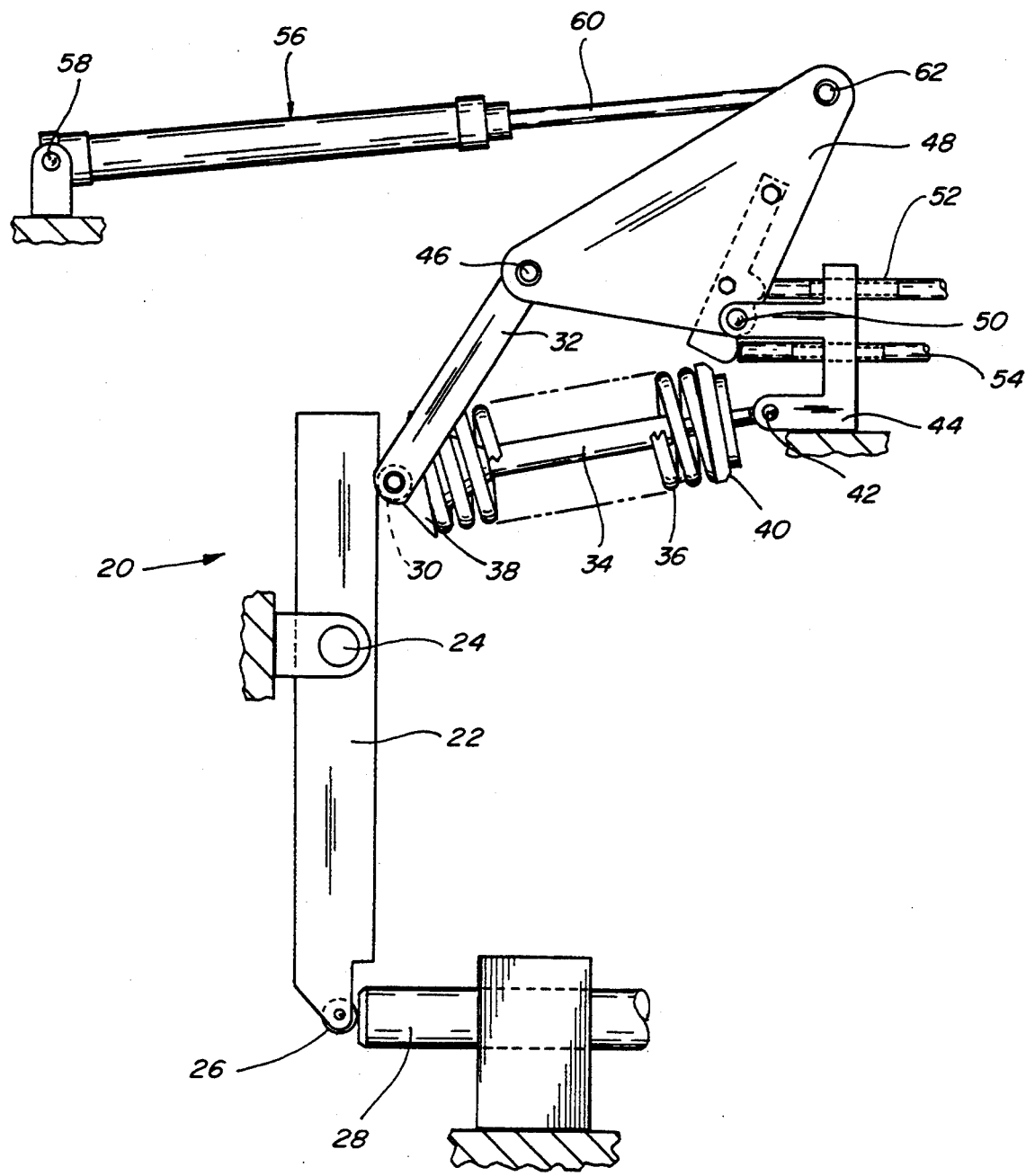
FIG. 1 is a diagramatic view of a device for applying force to a linearly movable feed rod, said device being shown in position applying one of two different selectable forces to the feed rod.

Referring to the drawings more particularly by reference numbers, number 20 in FIG. 1 refers to a linkage controlled spring powered feed system constructed according to the teachings of the present invention. The feed system 20 includes a main lever 22 that is pivotal about a pin 24 connected to a stationary member or frame. A roller 26 is mounted adjacent to one end of the lever 22, and the roller 26 engages the free end of an output shaft or feed rod 28. The force applied by the roller 26 against the feed rod 28 is substantially axially aligned with the feed rod 28, and the feed rod may be the feed rod of a machine tool such as a feed rod or wedge assembly or like device in a honing machine.

Force is applied near the opposite end of the lever 22 by an assembly which includes another roller 30 which is mounted adjacent to one end of a control link member 32 and adjacent to one end of spring biased link member 34 which is an expandable or extendable link that has a compression spring 36 mounted between spaced relatively movable end portion 38 and 40. The spring link member 34 at one end is pivotally connected by pin 42 to a fixed support or frame member 44. The force that the roller 30 applies to the main lever 22 is determined by the compression of the spring 36, the spring constant and the relative angles between the spring link member 34, the main lever 22 and the control link 32. The output force applied to the feed rod 28 is determined by the ratio of the distances between where the roller 26 is located on the main lever 22 relative to the pivot 24 and the position where the roller 30 engages the same lever 22 relative to the same pivot.

The control link 32 extends from its pivotal connection to the roller 30 to its opposite end which is pivotally connected by another pin 46 to an input link member 48. In this form of the present device the input link 48 is constrained from moving or pivoting by a mechanism used to select a desired output force to be applied to the feed rod 28. If it is never necessary to select between different output forces, then the input link 48 can be omitted and the control link 32 can be attached but made free to pivot about a pin on the fixed frame of the machine on which the device is installed, as shown in FIG. 11.

In many applications it is desirable that the output force applied to the feed rod 28 remain constant regardless of the position of the feed rod over the range of its movement. Another way of expressing this is to say that the feed rod 28 should be able to move over a given range while supplying a constant output force. As the feed rod 28 moves the main lever 22 pivots under the force applied by the spring link mechanism described above to maintain contact with the feed rod. As the main lever 22 pivots it also moves in a direction to cause the spring link 34 to become more extended due to the expansion that takes place in the compression spring 36. As the spring 36 expands it loses some compression and therefore relaxes to some extent and as a result is able to provide less force. This would correspond to a decreasing output force if it were not for a compensating motion of the control link 32 and the associated mechanism. The control link 32, as it pivots about its pin connection 46 to the input link 48, constrains the spring link roller 30 to move in a circular arc. Thus, as the main lever 22 pivots, the spring 36 extends the member 34, and at the same time the arc of movement of the control link 32 about its pivot 46 causes the spring link roller 30 to contact the main lever 22 at a progressively greater distance from the pivot 24. This movement compensates for the relaxation or extension of the spring 36. The amount of this compensation depends on the specific design, i.e., the relative positions of the pivot positions of the respective portions of the main lever 22 and the control link 32. The design of the present construction can be customized to provide only partial compensation (slightly diminishing output force) or even overcompensation (increasing the output force) if a specific application so requires. The specific design described herein is for a honing machine feed system that has a linkage selected to provide virtually perfect compensation for the variable force generated by the spring 36.

To select a different level of output force from the same mechanism it is necessary to move the input link 48 to a new or different position. To make this possible the input link 48 is pivotally mounted by a pin connection 50 which is attached to the frame. As the input link 48 pivots it moves the spring link roller 30 because of the movement of the control link 32 to contact the main lever 22 at a different distance from the pivot 24 on the main lever 22. It has been found that there is a direct and unique relationship between the angular position of the input link 48 and the contact point between the spring link roller 30 and the main lever 22. This means that the level of the output force selected is dependent only on the angular position of the input link 48. The relationship between this position and the output force selected is a function of the specific design, spring constant the relative link lengths and the pivot positions.

In many applications it is desirable to have a greater "resolution" or "sensitivity" of adjustment especially where the force selected is relatively low. This means that when the force selected is low, a small movement, or error in setting the input link 48 must be made not to result in too large an error in the level of the output force. Since the input link 48 has a limited range of useful travel, the most effective arrangement to minimize this error is to select a link that produces a curve of output force versus input link angular position that has a slope that increases as the force increases. Ideally, force varies exponentially with angular position. Although not perfectly exponential, the specific design selected for the honing feed system application is close to that ideal and provides for a much greater "resolution" of adjustment at the lower force levels. The range of forces that can be selected depends on the specific linkage design and the stiffness of the spring that is used. It is possible though usually not desirable to position the spring link roller 30 directly over the main lever pivot 24 to achieve an output force of "zero". As a practical matter the force constancy diminishes when the spring link roller 30 is extremely close to the pivot, but it has been discovered that ratios of as much as 100 to 1 are achievable with excellent force constancies at any point within that range.

Positioning the input link 48 to select or vary the force can be accomplished in a number of ways and with different degrees of sophistication. The simplest is to provide manual selection of force. This can be done using several different mechanisms such as set screws, a hand wheel with gears, bolts tightened against slots in the input link 48 and like mechanisms. The selection can also be graduated to indicate the amount of force that would be delivered in each selectable position.

Referring to FIG. 1, there is shown a dual force selection system which is particularly suitable for machine tools such as honing machines. In this construction two different forces can be selected manually by the setting of two limit screws 52 and 54 which may be attached to graduated hand wheels or the like. An air or hydraulic cylinder 56 is provided for use in rapidly switching the output force between the two selectable values. The cylinder 56 is pivotally connected to the support structure or machine frame by a pin 58 at one end, and the opposite end of the cylinder 56 includes a piston assembly 60 which is pivotally connected to the input link 48 by another pin 62. The input link 48 is shown in a position in engagement with the end of limit screw 54, which is a lower force limit screw, and which position corresponds to a relatively low output force. As the positioning device or cylinder 56 extends, the input link 48 pivots in a clockwise direction to a position corresponding to a higher output force (not shown). This motion continues until the input link 48 is stopped by engaging the end of the upper force limit screw 52. By this means the device is set for a relatively high output force on the feed rod 28. When the cylinder or positioning device 56 is a fluid cylinder as shown in FIG. 1, a two-stage force selection system is created. With this arrangement the output force can be rapidly switched between the two selectable forces by control means on the honing or other machine tool. However, even though the cylinder 56 provides means for rapidly moving between the preset selectable forces, it is also possible to manually adjust the desired output force by adjusting the limit screws 52 and 54. While the device shown in FIG. 1 uses the air or hydraulic cylinder 56 to change between selectable forces, it is also possible to use a motor or screw arrangement with an encoder or some other position feed back device. Such an arrangement can be controlled electronically and can be used to generate a force "profile" or a continuously variable force changing mode in a programmed manner with time or with the position of the feed rod or sensitive to in-process gaging in the case of a honing machine as the selected variable. With such an arrangement, it is not necessary to have limit screws such as the screws 52 and 54 as the force selection, and force programming would be achieved by an electronic data entry system such as by a keypad or the like.

Although some means could be provided to generate a force "profile" and to control the application of force by electronic or like means, the present device does not require such in order to maintain relatively constant force over a range of relatively small movement such as is necessary to operate a honing mandrel.

Figure 2:
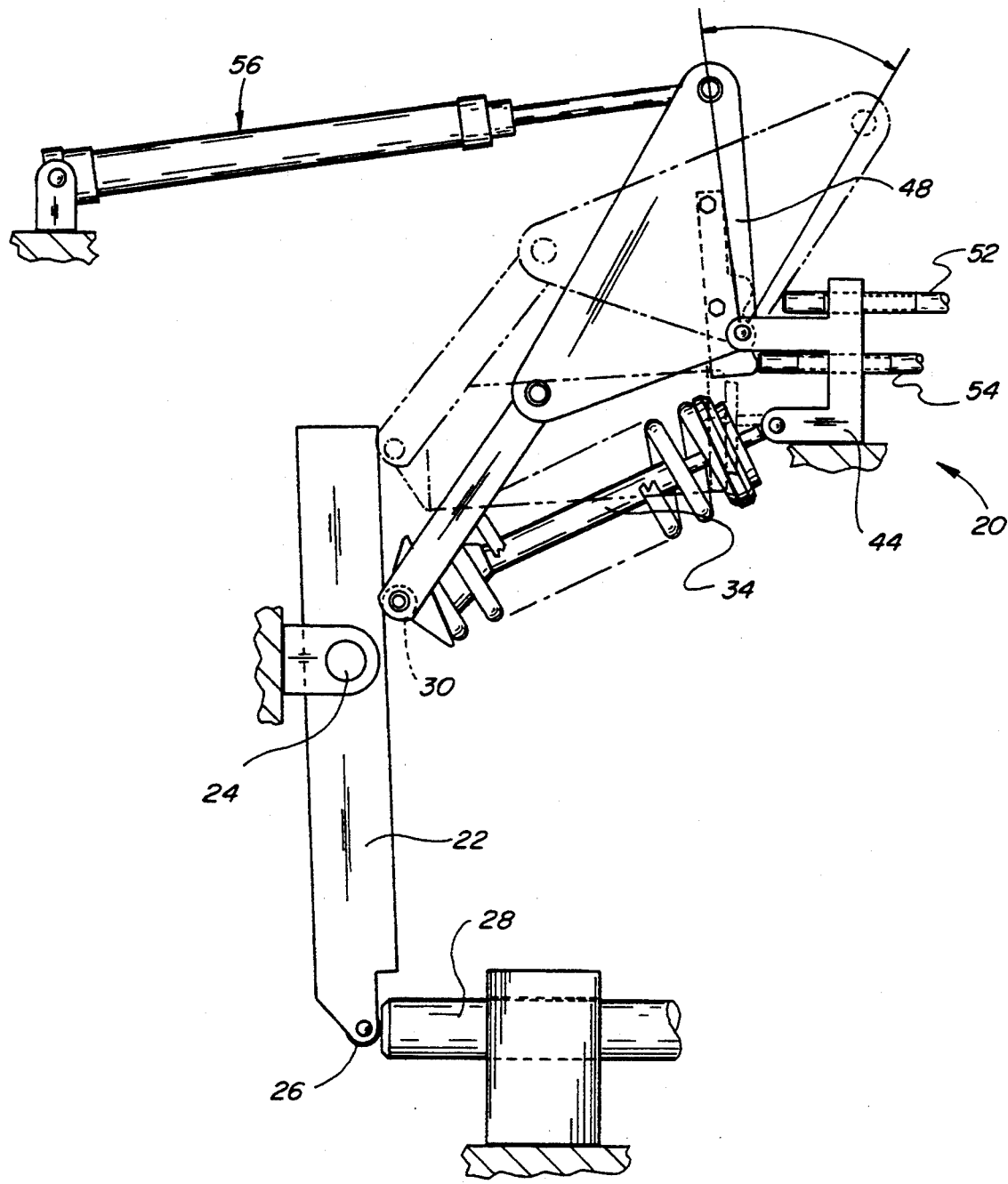
FIG. 2 is a view similar to FIG. 1, also showing in phantom lines the device in an alternate position applying a greater constant force to the feed rod.

In FIG. 1 the input link 48 is shown in its lower force limit setting, with the lower limit screw 54 set at one position, while in FIG. 2 the input link 48 is also shown in its lower force limit setting, but with the lower limit screw 54 set at a different position. FIG. 2 also shows, in phantom lines, the input link 48 pivoted clockwise about the support frame 44 by an angular displacement to its upper force limit setting in engagement with the set screw 52.

Figure 3:
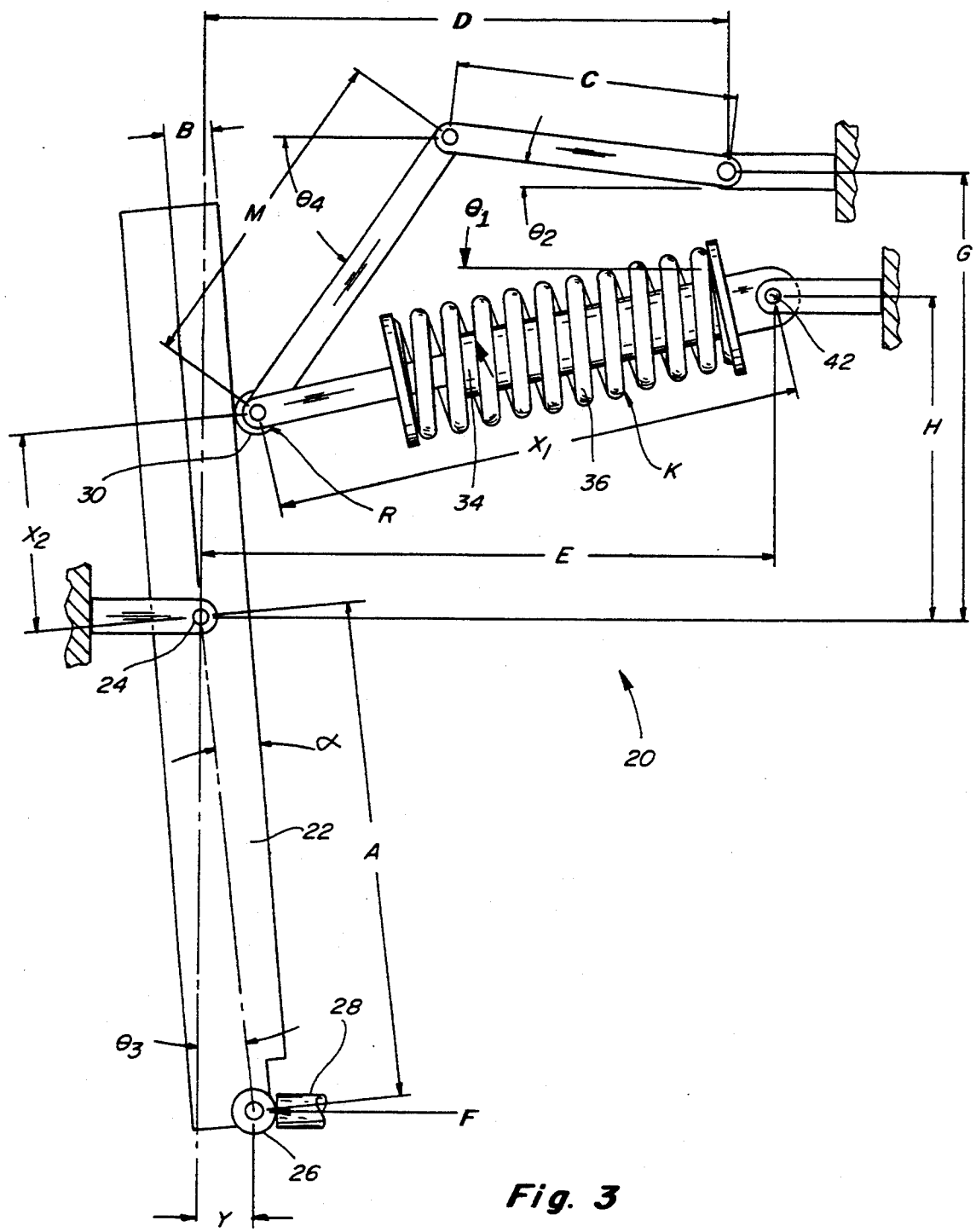
FIG. 3 is a diagramatic view of the subject device, said view showing various parameters associated therewith.

FIG. 3 is a schematic representation of the linkage controlled spring powered feed system 20, shown without the cylinder 56 and the associated mechanisms. The parameters, dimensions that will be fixed for any particular embodiment, are (1) the pertinent fixed link dimensions (A, B, C, M, R, $\alpha$); (2) the relative positions of the pivots on the frame of the machine (D, E, G, H); (3) the spring constant (K); and (4) the free length of the spring link 34 ($X_o$, not shown in FIG. 3). The variables in the construction shown in FIG. 3 are the angular positions of the various links ($\Theta_1$, $\Theta_2$, $\Theta_3$, $\Theta_4$), the length of the spring link 34 ($X_1$), the relative position of the point where the spring link roller 30 engages the main lever 22 ($X_2$) and the corresponding position where the roller 26 engages the end of the feed rod 28 (y), both relative to the fixed pivot position 24.

FIG. 4 is a fragmentary view of the spring link roller pivot end 38 and FIG. 5 is a diagram of the main lever 22 for the static analysis of the linkage. Static analysis is necessary to determine the output force F that is applied to the feed rod 28 at any given linkage position of the roller 30 against the main lever 22.

From the kinematic diagram (FIG. 3) five independent static balance equations may be written:

$$-(C)\cos(\Theta_2)-(M)\cos(\Theta_4)+(X_1)\cos(\Theta_1)-E+D=0$$

$$(C)\sin(\Theta_2)-(M)\sin(\Theta_4)+(X_1)\sin(\Theta_1)-H+G=0$$

$$(B+R)\cos(\alpha-\Theta_3)+(X_2)\sin(\alpha-\Theta_3)+(X_1)\cos(\Theta_1)-E=0$$

$$(B+R)\sin(\alpha-\Theta_3)+(X_2)\cos(\alpha-\Theta_3)+(X_1)\sin(\Theta_1)-H=0$$

$$(A)\sin(\Theta_3)-y=0$$

The static analysis provides force and moment equations as follows:

$$\Sigma F_{x'}=0 \text{ (FIG. 3): } (F_1)\sin(\Theta_4-\Theta_1)=(F_3)\sin(\Theta_4+\alpha-\Theta_3)$$

$$\Sigma M_o=0 \text{ (FIG. 4): } (X_2)(F_3)=(F)(A)\cos(\Theta_3)$$

Force of the Spring Link (not shown): $F_1=k(X_o-X_1)$

The force equations can be easily combined into one equation, eliminating $F_1$ and $F_3$:

$$[k(X_o-X_1)(X_2)\sin(\Theta_4-\Theta_1)\div[(A)\cos(\Theta_3)\sin(\Theta_4+\alpha-\Theta_3)]-F=0$$

The result of these equations is that for a specific defined linkage the output force is a function of the angular position of the input link 48 and the position of the feed rod 28. Referring to FIG. 3 this can be expressed as:

$$F = f(\Theta_2, y)$$

The actual design parameters for the subject device can be selected by trial and error or some optimization scheme to achieve the desired output force characteristics. For a honing application the force should remain as constant as possible over the range of movement of the feed rod 28, and the parameters should be selected to maintain the force virtually constant in the range of movement of the feed rod. In this case, the output force within the useful range of the feed rod travel (y) is a function of input link angle only:

$$F \approx f(\Theta_2)$$

It should also be taken into account that the main lever 22 can be constructed to have a flat face engaged by the rollers 26 and 30, as shown, or the face engaged by one or both of the rollers can be curved to vary the force characteristics over the range of movement of the input link 48.

In a device such as a honing machine, the performance is optimum when the pressure applied by the abrasive against the workpiece is maintained constant. However, the optimum pressure varies widely from one honing application to the next, depending on abrasive and workpiece size and material. Therefore, the feed force must be selectable in a continuous fashion so that the optimum performance can be achieved for all honing applications.

One specific linkage and spring may be designed for a specific honing machine. By scaling, other linkage and spring combinations can be easily made to provide virtually constant force over any given distance where the output force is selectable and where the maximum available force is 100 times the minimum available force. Because the linkage can be scaled to any size, the specific details given here have been made dimensionless so as to describe a "family" of constant force mechanisms. A virtually constant force mechanism has been created when the linkages shown in FIG. 3 have the following relationships:

B/A = 0.100
C/A = 0.575
D/A = 1.075
E/A = 1.175
G/A = 0.900
H/A = 0.650
M/A = 0.678
R/A = 0.0474
X$_o$/A = 1.397
α = 0.43°

Note that the angle α is not a scaled value. However, because the static analysis depends only on the balancing of moments about the main lever pivot 24, an equivalent mechanism can be created by "bending" the main lever 22 at the pivot 24 and relocating the controlling linkage (including the frame) by rotating it through that same angle about the main lever pivot 24.

In the simplest embodiment of the present device, capable of producing only a single level of output force (FIG. 11), the input link is absent and the control link 32 is pivotally attached to the frame. The position of this attachment point relative to the other pivots is critical to the consistency of the output force. To determine this location, the results given above for the general device can be used by assuming that the input link 48 is present but fixed at the specific angle $\Theta_2$ that corresponds to the desired single output force. Then the control link pivot position can be derived mathematically from the results given above.

Figure 6:
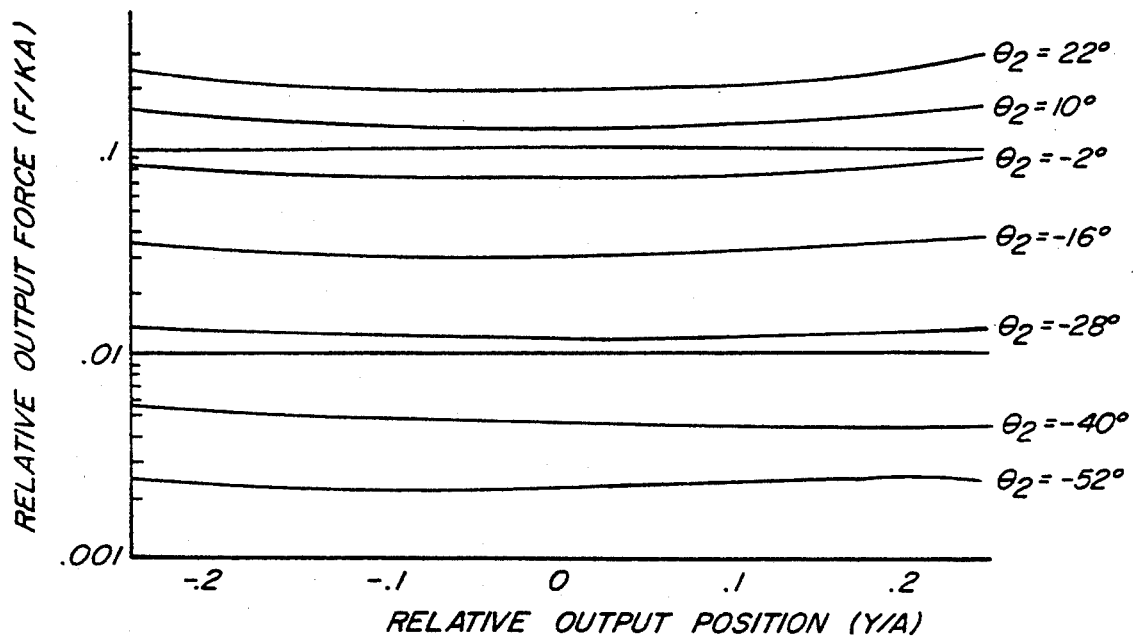
FIG. 6 is a graph of various output forces applied to a linearly movable feed rod as a function of the relative output position of the feed rod.

FIG. 6 is a graph of the dimensionless output "Force" as a function of output "Position". The force is made dimensionless by making it a ratio with the spring constant and the length "A". It can be seen that a constant force can be provided over a range that is at least ±10% of dimension "A". This virtually constant force can be selected to have any value between a minmum force that is 0.002 times the spring constant times the dimension "A" to a maximum force that is 0.2 times the spring constant times the dimension "A".

Another important feature of this specific family of mechanisms is the nearly optimum sensitivity of the output force to the means for selecting the output force. For many applications (such as for a honing machine feed system), the ideal "resolution" of the input device is such that a given change in the input should make an equivalent percentage change in output force at any point in the range of available force. This means that no point in the range is more sensitive to input errors than any other. In many applications the absolute error is less important than the percentage of error.

The input quantity is the angular position of the input link, $\Theta_2$. The ideal relationship then is:

$$\frac{d[\log(F)]}{d\Theta_2} = \text{constant (i.e. straight line on a semi-log graph)}$$

Figure 7:
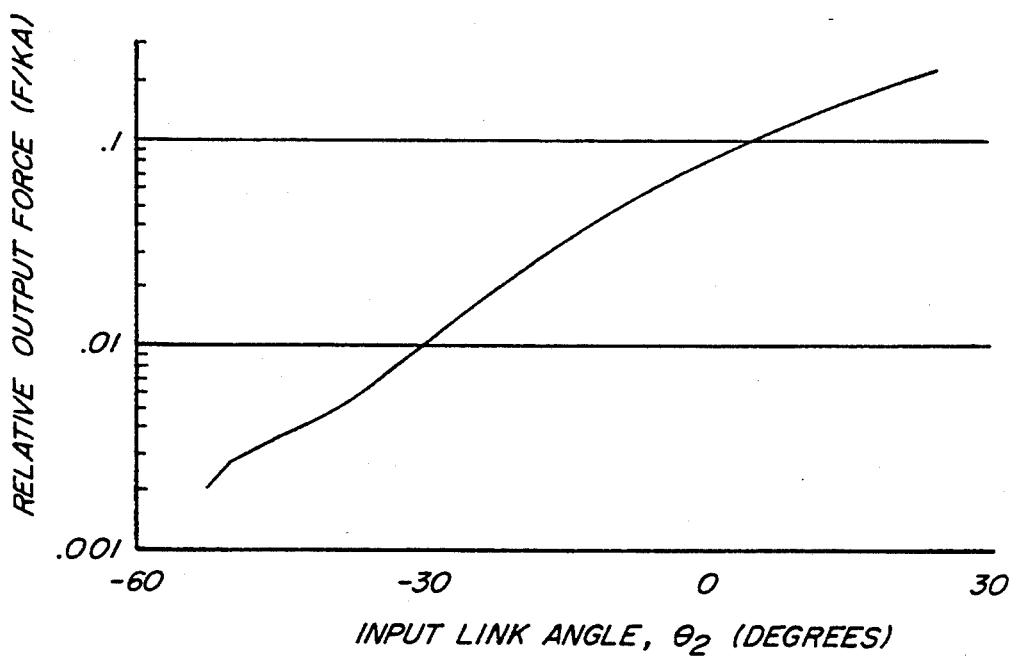
FIG. 7 is a graph of the output force applied to the feed rod as a function of the input link angle Θ2 of the device shown in FIG. 3.

FIG. 7 is a graph of selected output force plotted against the input link angle. The specific family of mechanisms described here very nearly approach this ideal characteristic of the output to input sensitivity.

Figure 8:
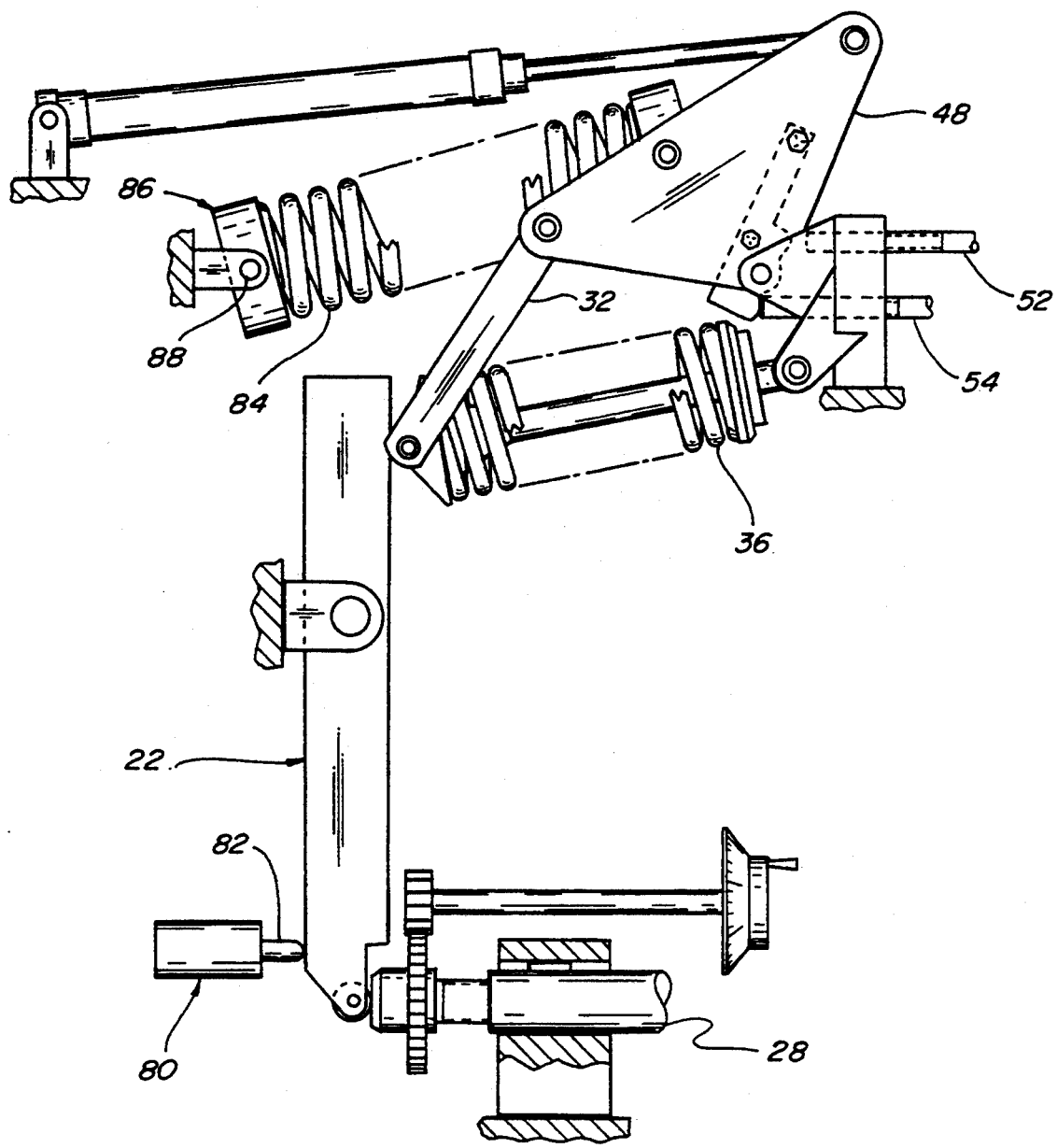
FIG. 8 is a diagramatic view showing another embodiment of the subject device modified to include a counter balance spring, feed dial adjustment means and feed rod sensor means associated therewith.

Several features can be added to the basic feed mechanism to enhance its usefulness and/or to tailor it to specific applications. As indicated above, the device can also be switched from one force level to another by actuator means that changes the position of the input link 48. The positioning means for moving the input link can have several forms including being a continuously variable device such as a motor and a screw mechanism or it can be operated by moving between discrete positions using a fluid power cylinder or like means. It is also possible to vary the position of the input link 48 with respect to time so as to change the honing pressure of a honing mandrel as the honing operation proceeds, or with respect to in-process gaging or it may be desirable to vary the position of the input link 48 with respect to the position of the feed rod 28. If this latter is done a feed rod position sensor or switch will be required. Such a feedback device is shown in FIG. 8 wherein a feed rod position sensor 80 is shown having a movement arm 82 that engages the backside of the main lever 22.

A switch rather than the sensor 80 could be used, in which case it will be mounted on a screw mechanism or other such device to enable the operator to set the "trigger point" at which the switch will be actuated and the output force will change.

In a specific device such as a feed system for a honing machine, a two-stage control can be used to create a rough honing stage at some desired force followed by a finish honing stage at a relatively lower force. The amount of workpiece material removed during each stage will depend upon the application. Also, the point at which the force changes from the rough honing stage to the finish honing stage can be made to respond to a given position of the feed rod 28, which represents a certain amount of material yet to be removed, or it can be made to respond to some other measured quantity such as time. The point at which the force switches from rough honing force to fine honing force can be a device as simple as a switch that is transferred at a particular position of the feed rod 28 which is a position that corresponds to some known or constant bore size with a known or constant amount of material yet to be removed during the finishing stage.

A switch or feed rod position sensor can also be used to coordinate certain other machine functions with the feed rod position. For example, the sensor may respond to a condition representing a predetermined workpiece size so that when this size is reached no more feeding of the feed rod will take place. This point is sometime referred to as the zero shut-off point. If the zero shut-off point is fixed relative to the linkage, then some mechanism will be required to position the end of the feed rod that connects with the honing tool in such a manner that the zero shut-off point corresponds to the desired finished workpiece size.

As the honing tool and its abrasive show wear it becomes necessary to compensate for this in the feed rod positioning means. FIG. 8 shows one possible mechanism to accomplish this task. Essentially, the feed rod is a two piece feed screw assembly. The length of the assembly is changed by turning one piece of the assembly relative to the other. This can be accomplished through, for instance, a gear and/or pulley/belt arrangement. This can in turn be driven manually or by machine control such as a motor or mechanical actuator. A manual input can be a graduated handwheel to give precise control of feed rod position. By these means the feed rod 28 can be lengthened or shortened to position the wedge of the honing tool so that the zero shut-off point will correspond to the desired finish bore size, and thereafter to provide compensation for the abrasive/tool wear.

A feed rod position sensor can also be used to provide an analog or digital display of feed rod position. In the case of the honing machine, a display of the amount of material to be removed from the workpiece is more useful so the signal is scaled electronically to display that position. Also, since this feed system can accommodate a variety of honing tools, each with different wedge angles, an electronic selection means can be provided to scale the displayed position accurately for each honing tool.

Figure 12:
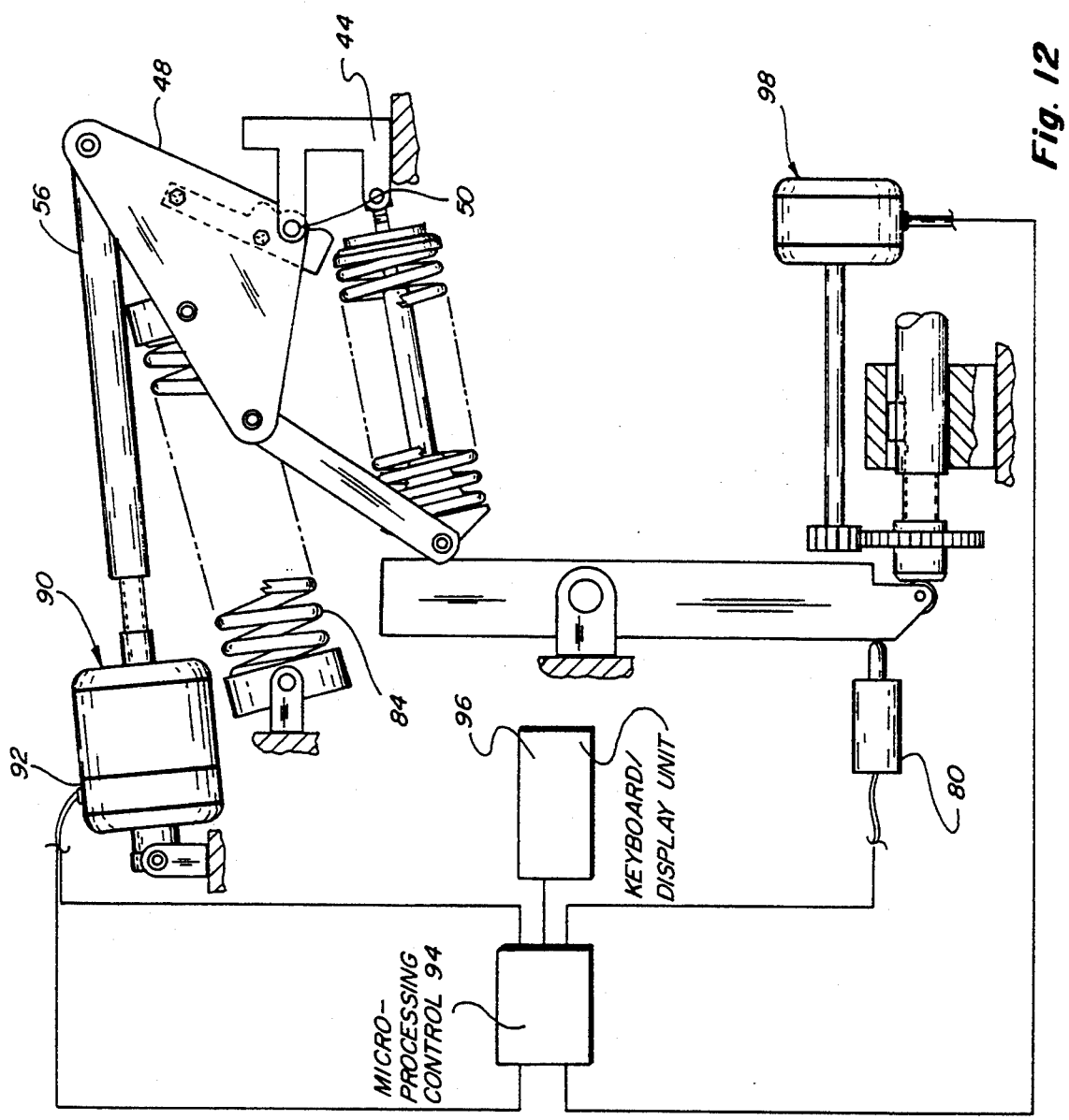
FIG. 12 shows the device with electronic control means for sophisticated force profiling and automated feed rod position control.

FIG. 12 shows another embodiment of the present device constructed to be controlled electronically. The input link positioning function described above can be accomplished with a motor 90 with an encoder 92 for automated force selection or force profiling through interaction with a microprocessor 94 and keyboard/display unit 96. The microprocessor 94 can use time or feed rod position data from the sensor 80 or in-process gaging data as its input to control the motor 90. Also with a microprocessor 94, the feed rod positioning and stonewear compensating functions described above can be accomplished by a feed positioning motor 98 controlled by the microprocessor 94 with inputs from the keyboard 96.

The force taken by the control link can be a significant percentage of the force generated by the spring link. In the specific linkage detailed here, that force can be relatively high. This creates a large moment about the pivot 50 where the input link 48 is joined to the frame. The input link 48 is positioned by the manual force limit screws 52 or 54 (not shown) and/or the positioning device 56. To move the input link 48 or even to hold it stationary requires the positioning mechanisms to resist the moment created by the control link 32 acting on the input link 48. In the specific feed system detailed here this moment creates such a large force against the force limit screws 52 or 54 so that they cannot be manually adjusted using means such as an attached handwheel (not shown). This situation is made worse by the fact that the positioning device must provide great force to move the input link 48 or hold it against one of the limit screws 52 or 54.

A solution to this problem is to add means to counteract the moment on the input link 48. The counterbalance spring 84 in FIG. 8 is such a device. The counterbalance spring 84 is mounted on another extendable link assembly 86 that is attached by pivot means 88 at one end to the fixed frame and at the opposite end to the input link 48. The spring constant and the location of the attachment points are designed so that the force of the counterbalance spring 84 creates a moment on the input link 48 that acts in the opposite direction from the moment created by the force of the control link 32 at every position of the input link 48. Although this counterbalancing is not perfect, the magnitude of the counteracting moment is a significant percentage of the moment created by the control link 32 in all positions. The result is a reduced force on the force limit screws 52 and 54 so that they can be turned relatively easily, even manually, and a smaller positioning device (less required load capacity) can be used. As in the device as shown in FIG. 8 the counterbalance spring 84 may even have the same characteristics as the spring 36 used for the spring link.

Some means are necessary to control the position of the main lever 22 when it is not desirable to apply all of the selected feed rod force to the feed rod 28 as in a honing machine feed system for such functions as (1) setting or checking zero shut-off position, (2) installing a honing tool, (3) loading or unloading the workpiece and (4) initializing the feed rod position. This can be accomplished by an actuator acting on the main lever 22 with various levels of sophistication. One example would be to use a rotating control cam 100 (FIG. 9) whose position is determined by a rotary or linear actuator and made to contact the main lever 22 to position and restrain advancement of the same.

Manual control over the position of the main lever 22 would also be desirable. This can be done through the use of handwheels and set screws. Another way to manually control the position of the main lever 22 would be to use a cable 102 fastened to the control cam 100 as described above and a foot pedal 104 as shown in FIG. 9. As the foot pedal 104 is depressed, connected cable 102 moves with the pedal 104 and pulls on the control cam 100 to rotate it against the main lever 22. This moves or restrains the main lever 22 from forward advancement.

In some configurations of the linkage controlled spring powered feed system, the means of controlling movement of the main lever 22 will need assistance to negate a high main lever moment and allow the use of manual control and a smaller positioning device (less required load capacity). A way of maintaining the force required to reposition the main lever 22 at a minimum is to make the assistance dependent on the input link 48 position and thus the main lever moment. The feedback from a rotary transducer on the input link 48 can be used to control an actuator which would regulate the amount of assistance needed to make manual control possible and to minimize the power requirement of the main lever position actuator.

Figure 9:
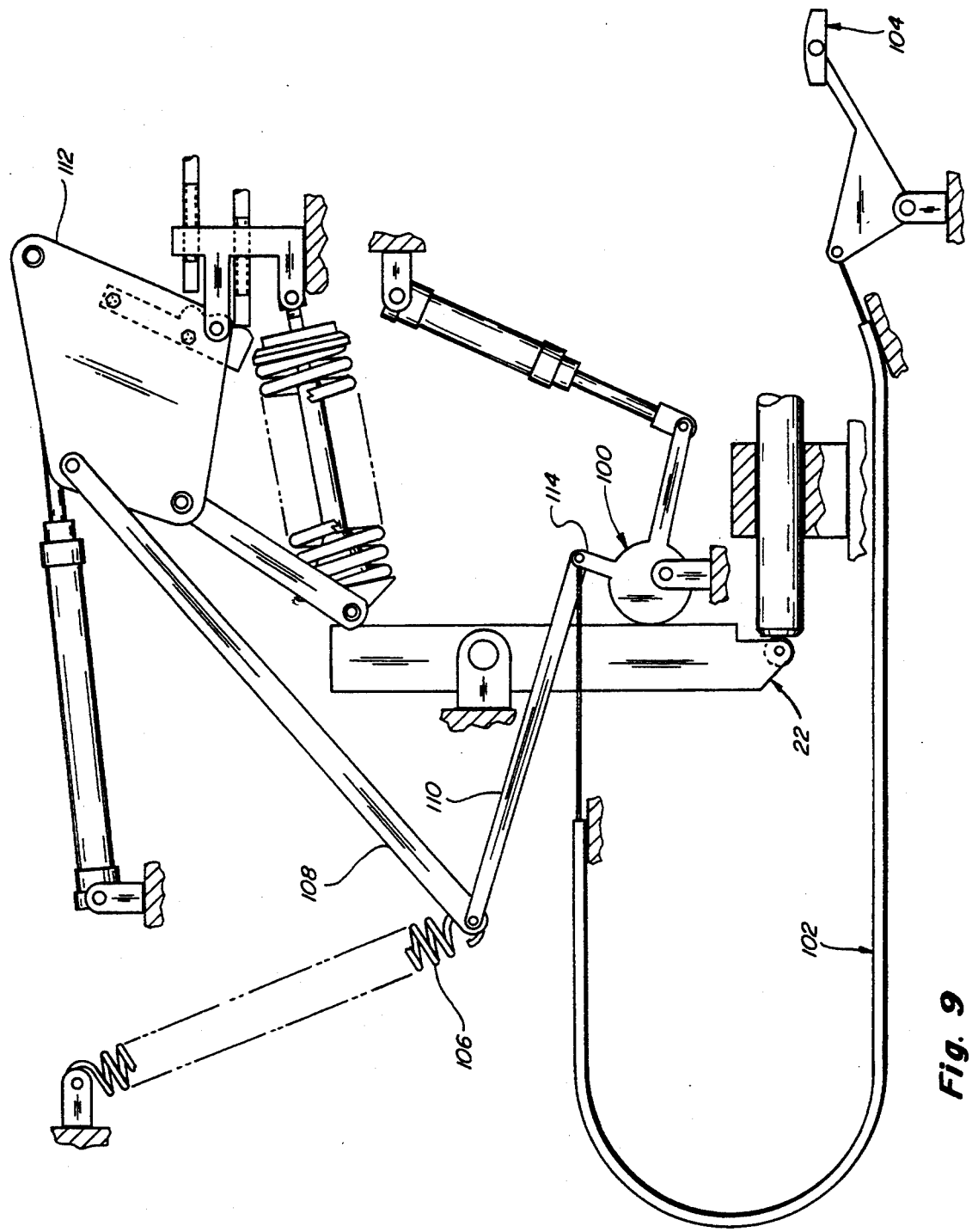
FIG. 9 is a cross-sectional view showing another embodiment of the subject device with a foot pedal operator mechanism.

A mechanical means of matching the amount of assistance to the input link position would be to use a spring 106 of an optimum spring constant, length and position and two links 108 and 110 of optimum length and position as shown in FIG. 9. The spring 106 would be fastened between the frame and the union of the two links 108 and 110, the end of the link 108 being fastened to the input link 112 and the end of the other link 110 being fastened to lever portion 114 of the control cam 100. As the input link 112 is rotated to provide more force to the main lever 22 the control cam 100 requires more moment to rotate against the main lever 22, but an assisting moment acting on the cam 100 would be provided by the spring 106 and the associated link arrangement.

For some applications of the machine, a means of controlling and limiting the rate of advancement of the feed rod 28 may be desirable as described in Vanderwal U.S. Pat. No. 4,397,658. In this case a position regulator such as an oil damper 120 can be used to control the speed of forward movement of the feed rod 28 at a set constant rate. The oil damper 120 can directly resist and control forward movement of the feed rod 28 or main lever 22, or it can control the rotation of a control cam 122 that bears against the main lever 22 as shown in FIG. 10.

Figure 10:
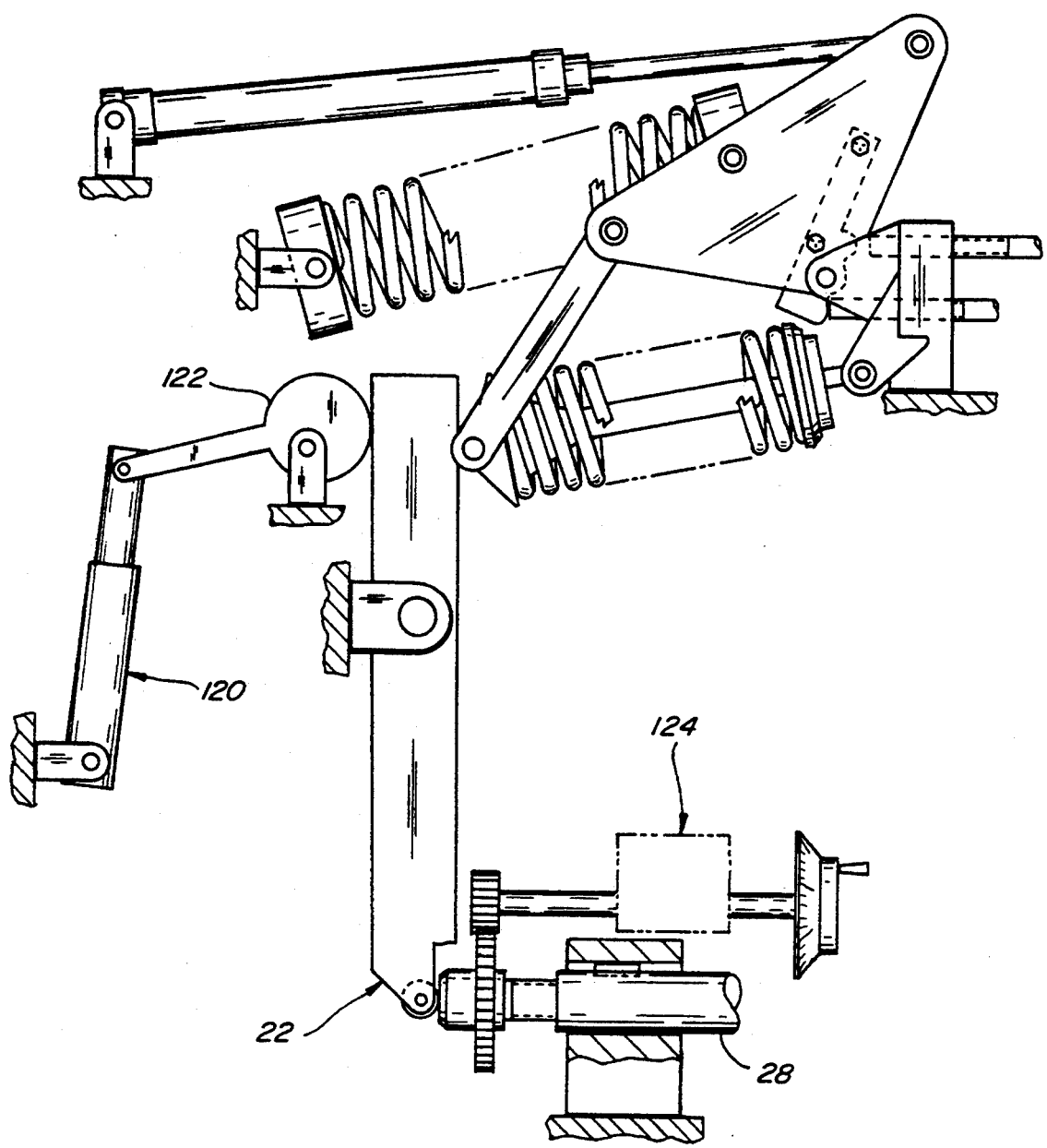
FIG. 10 shows still another modified form of the subject device, where a cam governed by an oil damper limits the velocity of the main lever and thus the velocity of feed rod advancement.

An added feature of the embodiment of FIG. 10 is to provide a mechanism 124 (electrical, mechanical, and/or otherwise) to automatically index the feed rod 28 length to compensate for stone wear and tool wear based on an operator input if zero shut-off is used or based on feed rod position if some external in-process size control device is used instead of the zero shut-off.

It is now apparent that there has been disclosed several embodiments of a device for imparting linear motion at a selectable predetermined force to a movable member, and to do so in a manner that enables the device to be adjusted for imparting selected different forces within a wide range of possible forces. The disclosure covers a number of optional features including features which enable manual as well as motor driven control over adjustment of the force, it shows the possibility of foot pedal operation, it enables the use of controlled force at one or more values in a machine tool such as in a honing machine where the controls for the machine tool can be manual or automatic including computer controlled, and a disclosure covers the possibility of providing a relatively simple embodiment of the device as well as more sophisticated embodiments providing a greater range of adjustability as to the force selection as well as other options.

Thus there has been shown and described several embodiments of a novel linkage controlled spring powered feed system which fulfills all of the objects and advantages sought therefor. It will be apparent to those skilled in the art, however, that many changes, modifications, variations and other uses and applications for the subject device or system including applications in a variety of machine operations are possible and contemplated. All such changes, modifications, variations and other uses in applications which do not depart for the spirit and scope of the invention are deemed to be covered by the invention which is limited only by the claims which follow.

What is claimed is:

1. In a machine having a linearly movable feed member the improvement comprising means for applying a substantially constant force on the feed member over a limited range of movement thereof including a lever having a first end with means adjacent thereto adapted to engage the feed member and an opposite end, means located between said ends supporting said lever for pivotal movement, and means engageable with said lever at a location between the pivotal support means and the opposite end thereof for applying controlled force thereto in a direction to apply force to the feed member, said means including a linkage assembly having a first expandable link member engageable with the lever having a compression spring mounted thereon in position to exert force against said lever at the location between the pivotal support means and the opposite end thereof, and a second link member in the linkage assembly for adjusting the position where the first expandable link member engages the lever as the lever moves about the pivotal support means.

2. In the machine of claim 1 wherein the first expandable link member has a roller that engages the lever and means associated with the second link member for adjusting the position thereof and the position where the roller engages the lever including means for selecting between two different locations where the roller engages the lever.

3. In the machine of claim 1 wherein the angular relationship between the first expandable link member and the second link member establishes the moment acting on the lever and thus the force applied by the lever against the linearly movable feed member.

4. In the machine of claim 1 wherein the spring has selectable spring characteristics, the links have selectable relative link lengths and selectable relative pivot positions, the spring characteristics, the relative link lengths, and the relative pivot positions being selected to deliver a constant force on the linearly movable feed member over a predetermined range of movement of the linearly movable feed member.

5. In the machine of claim 1 wherein the spring has selectable spring characteristics, the links have selectable relative link lengths and selectable relative pivot positions, the spring characteristics, the relative link lengths, and the relative pivot positions being selected to deliver a force that decreases as the linearly movable feed member moves.

6. In the machine of claim 1 wherein the spring has selectable spring characteristics, the links have selectable relative link lengths and selectable relative pivot positions, the spring characteristics, the relative link lengths, and the relative pivot positions being selected so that the force delivered to the linearly movable feed member increases as the linearly movable feed member moves.

7. In the machine of claim 4 wherein the spring characteristics, the relative link lengths, and the relative pivot positions are selected such that the maximum selectable force applied to the linearly movable feed member is approximately 100 times the minimum selectable force.

8. In the machine of claim 1 wherein the linearly movable feed member engages a wedge member in a honing mandrel.

9. Means to maintain a relatively constant force on a linearly movable member comprising:
a linearly movable member having first and second opposite ends and means to support the member for linear movement, a lever member having means adjacent one end thereof forming frictionless contact with one end of the linearly movable member,
means spaced from the one end of the lever member pivotally mounting the lever member to a fixed support at an intermediate location therealong, and
means engageable with the lever member on the opposite side of the lever pivotal mounting means from the frictionless contact for applying force to the lever member and through the lever member to the linearly movable member, said last named means including a pair of angularly related link members pivotally connected to each other adjacent one end by means that make frictionless contact with the lever member, each link member having an opposite end, the opposite ends of each of said angularly related link members being pivotally connected to spaced locations on a fixed support, one of said angularly related link members having a fixed length and the other being an expandable link member formed by relatively movable slide portions with spaced opposed end portions and a compression spring member positioned between the end portions urging them apart to apply pressure against the lever member and through the lever member to the linearly movable member.

10. Means to apply a relatively constant force to a linearly movable member comprising a member mounted for linear movement, said member having opposite surfaces, a lever pivotally connected at an intermediate location to a fixed support structure, said lever having means adjacent one end forming a frictionless engagement with one of the opposite surfaces of the linearly movable member, and means for applying force to the lever at a location on the opposite side of the pivot from the linearly movable member to apply force to the lever about the pivot and to the linearly movable member, said last named means including a pair of angularly related link members pivotally connected together adjacent one end thereof by means that make frictionless contact with the lever, said link members each having an opposite end, the opposite ends of said link members being pivotally connected to respective spaced locations on the fixed support structure, one of said link members having a compression spring mounted thereon for expanding the length thereof in a direction to apply force to the lever, the pivotal connections of the opposite ends of the link members to the support structure being such that movement of the linearly movable member due to force applied thereto by expansion of the compression spring causes the location on the lever where said means make frictionless contact therewith to change whereby as the force applied to the lever due to expansion of the compression spring decreases the distance between where said means make frictionless contact with the lever and the pivot increases.

11. A device for applying a virtually constant pressure on a linearly movable member comprising a linearly movable member including means for supporting the member, an elongated lever having means adjacent one end for abutting the linearly movable member, means to pivotally support the lever at an intermediate location therealong, and means engageable with the lever on the opposite side of the pivot support means from where the lever engages the linearly movable member, said last named means including angularly related link members including a first link member formed by relatively movable portions with spring means biasing the relatively movable members into an elongated condition, one end of said first link member being pivotally attached to a fixed support structure, the first link member having an opposite end pivotally connected to the second link member and means on the connection thereof for engaging the lever, said second link member having a fixed length and an opposite end, means for adjusting the position of the opposite end of the second link member including a main link member pivotally connected to the support structure and including means for adjusting the angular position of the main link member to change the position of the location where the second link member is pivotally connected thereto.

12. The device of claim 11 wherein the means for changing the position of the main link member includes fluid power means.

13. The device of claim 11 wherein the means for changing the position of the main link member include motor means.

14. The device of claim 11 including means for establishing two alternative fixed positions for the main link member, one of said fixed positions establishing a first force of the lever against the linearly movable member and the other fixed position establishing a different force of the lever member against the linearly movable member, and means for moving the main link member between the two fixed positions.

15. The device of claim 14 wherein the means for establishing the two alternative fixed positions include means for adjusting the location of the fixed positions.

16. The device of claim 11 including a third link member having a first end pivotally connected to a fixed support and an opposite end pivotally connected to the main link member, said third link member having a spring means thereon in position to exert force on the main link member in a direction to make angular movement thereof possible with less force.

17. The device of claim 11 including a sensor device having a movable member engageable with the lever, the position of said movable member indicating the instantaneous position of the linearly movable member.

18. The device of claim 11 including a switch having a movable operator member engageable with the lever, and means responsive to the condition of the switch to establish the force to be applied to the linearly movable member by the lever.

19. The device of claim 11 including cam means engageable with the lever and means for moving the cam between a position preventing the lever from applying force to the linearly movable member and a position permitting force to be applied by the lever to the linearly movable member.

20. The means of claim 11 including cam means engageable with the lever, and means to apply force to the cam member in a direction to control the forward advancement of the lever at a selectable constant rate.

21. The means of claim 11 including motor means operatively connected to the main link member for moving the main link member to establish a different force against the linearly movable member, and means to control the motor means including a microprocessor connected to the motor means and means for sensing the position of the linearly movable member, said last name means having a connection to the lever and a connection to the microprocessor.

22. The device of claim 11 including cam means engageable with the lever, means for applying force to the cam means in a direction to counteract the force applied by the lever against the linearly movable member, and actuator means for disengaging said cam means from the lever.

23. The device of claim 22 further including means for applying additional counteracting force to the cam means to lessen the force required by said means for applying force to the cam means, said means for applying additional counteracting force including spring means, a cam link member and a force adjusting link member, said spring means being connected between the fixed support structure and one end of said cam link member, the opposite end of said cam link member being pivotally connected to said cam means, said spring means applying force through said cam link member to said cam means to counteract the force applied by the lever against the linearly movable member, said force adjusting link member having one end pivotally connected to said cam link member adjacent said one end thereof and an opposite end pivotally connected to said main link member to change the effectiveness of said spring means in applying force to said cam means when the angular position of the main link member is adjusted.

24. The device of claim 11 wherein the angularly related link members have selectable relative lengths, the spring means have a selectable spring constant, and the relative positions of the pivotal connections for the main link member and for the lever are selectable, the relative lengths of the angularly related link members, the spring constant of the spring means, and the relative positions of the pivotal connections for the main link member and for the lever being selected so that the level of the output force applied to the linearly movable member varies exponentially with changes in the angular position of the main link member, incremental changes in the output force requiring greater angular movement of the main link member when the output force is relatively small as compared to when the output force is relatively large.

* * * * *